United States Patent
Kasono (10) Patent No.: US 6,711,115 B2
(45) Date of Patent: Mar. 23, 2004

(54) SLIDER MOVING DEVICE AND INFORMATION RECORDING/REPRODUCING APPARATUS

(75) Inventor: Osamu Kasono, Saitama-ken (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 09/811,522

(22) Filed: Mar. 20, 2001

(65) Prior Publication Data

US 2001/0028622 A1 Oct. 11, 2001

(30) Foreign Application Priority Data

Mar. 24, 2000 (JP) ........................................ 2000-084128
Mar. 28, 2000 (JP) ........................................ 2000-087728

(51) Int. Cl.[7] .................................................. G11B 7/00
(52) U.S. Cl. .................... 369/112.23; 369/44.23; 369/44.14
(58) Field of Search ...................... 369/44.11, 44.12, 369/44.14, 44.23, 112.01, 112.08, 112.13, 112.2, 112.23, 112.26

(56) References Cited

U.S. PATENT DOCUMENTS 6,055,220 A * 4/2000 Mamin et al. ......... 369/112.23
6,061,322 A * 5/2000 Jain et al. .............. 369/112.24
6,369,957 B1 * 4/2002 Ishida ..................... 369/44.14
6,434,088 B1 * 8/2002 Ishizaki et al. ........ 369/112.23

* cited by examiner

*Primary Examiner*—Muhammad Edun
(74) *Attorney, Agent, or Firm*—Arent Fox Kintner Plotkin & Kahn, PLLC (57) ABSTRACT

It is an object of the present invention to provide an improved slider moving device and an improved information recording and reproducing apparatus equipped with the improved slider moving device. The improved slider moving device is so formed that a slider mounting an information reading or recording means can be moved to a predetermined position in a direction approaching an information recording medium, and can also be moved to a predetermined position in a radial direction of the information recording medium, characterized in that a first material formed on the slider's one surface facing the information recording medium is the same as or close to, in the electrification precedence, a second material formed on the information recording medium's one surface facing the slider.

8 Claims, 5 Drawing Sheets

| MATERIAL A | MATERIAL B | MATERIAL C |
|---|---|---|
| RESIST | — | SPIN COATING WITH A RESIST AND THEN BACKING |
| OVERCOAT | — | SPIN COATING AND THEN UV HARDENING |
| COVER GLASS | GLASS (TO BE POLISHED SO AS TO PREVENT A HEIGHT DIFFERENCE BETWEEN SIL AND THE BOTTOM OF FLOATING SLIDER) | GLASS (TO BE BONDED) |
| COVER GLASS | GLASS (TO BE POLISHED SO AS TO PREVENT A HEIGHT DIFFERENCE BETWEEN SIL 6 AND THE BOTTOM OF FLOATING SLIDER 3) SIL 6 AND FLOATING SLIDER 3 ARE INTEGRALLY FORMED TOGETHER | GLASS (TO BE BONDED) |
| PLASTIC | PLASTIC (INTEGRAL FORMATION) | — |

PRIOR ART

SLIDER MOVING DEVICE AND INFORMATION RECORDING/ REPRODUCING APPARATUS

BACKGROUND OF THE INVENTION

The present invention relates to a slider moving device and an information recording/reproducing apparatus. In particular, this invention relates to a slider moving device holding a floating slider mounting a solid immersion lens, capable of preventing a crash (possibly caused due to a static electricity) of the floating slider. This invention also relates to an information recording/reproducing apparatus equipped with such a slider moving device.

In order for an optical disc to have an improved recording density, it is necessary to use a laser light having a short wavelength and an objective lens having a large numerical aperture NA. However, it is often not so easy to develop and manufacture a semiconductor laser capable of producing a laser light having a short wavelength. Moreover, although an increased diameter of an objective lens and its reduced working distance will be effective for increasing the numerical aperture NA of the optical lens, such an increased lens diameter will result in an optical head (an optical pickup mounting the objective lens) having a complex structure and makes it difficult to produce an information recording/ reproducing apparatus having a compact size.

To solve the above problem, there has been suggested a solid immersion lens for use in recording information on an optical disc. In detail, an objective lens and a solid immersion lens are used, so that a converged laser light may be further converged so as to form a further smaller light beam spot. Further, a floating slider is provided to mount the solid immersion lens. By virtue of the floating slider, during an information recording process an optical disc may be separated from the solid immersion lens at a distance of 50 to 100 nm.

When the floating slider mounting the solid immersion lens is located in a position over an optical disc (being rotated), if a suspension from which the floating slider has been attached is made movable in the vertical direction, it is possible to perform a desired control in a manner such that the floating slider can gradually get close from a remote position to the surface of the optical disc.

At this time, since a material forming the optical disc is different from a material forming the slider, when the slider is moved upwardly and the disc is rotated, a static electricity is generated. Further, an electrification polarity of one substance will depend upon the property of another substance (when they are in a mutually frictional relation) and it is known that if an epistatic substance (in the electrification precedence) is caused to rub against a hypostatic substance (in the electrification precedence), the epistatic substance will be electrified with positive charges (+), whereas the hypostatic substance will be electrified with negative charges (−).

Here, so called electrification precedence means a list in which when two different substances are caused to rub against each other, the one easy to be electrified with positive charges (+) is located at an epistatic position, while the other easy to be electrified with negative charges (−) is located at a hipostatic position.

When an optical disc coated with a resist film and a floating slider formed by a ceramic get close to each other and thus attract each other, or when surrounding dust is attracted by the disc and/or slider, there is a possibility that the disc and/or slider can be crashed.

Furthermore, the present invention relates to another slider moving device holding a slider mounting a solid immersion lens (serving as a second lens for further converging a light beam converged by an objective lens), capable of preventing a crash (possibly caused due to a static electricity) of a floating slider.

In order for an optical disc to have an improved recording density, it is necessary to use a laser light having a short wavelength and an objective lens having a large numerical aperture NA. However, it is often not so easy to develop and manufacture a semiconductor laser capable of producing a laser light having a short wavelength. Moreover, although an increased diameter of an objective lens and its reduced working distance will be effective for increasing the numerical aperture of the optical lens, such an increased lens diameter will result in an optical head (an optical pickup mounting the objective lens) having a complex structure and makes it difficult to produce an information recording/ reproducing apparatus compact in size.

To solve the above problem, there has been suggested a solid immersion lens (serving as a second lens for further converging a light beam converged by an objective lens, sometimes referred to as SIL in the present specification) for use in recording information on an optical disc, as described by S. M. Mansfield in an article entitled "High-Numerical-Aperture Lens System for Optical Storage (OPTICS LETTERS/Vol. 18, No.4, 305–307/Feb. 15, 1993).

Figure 7:
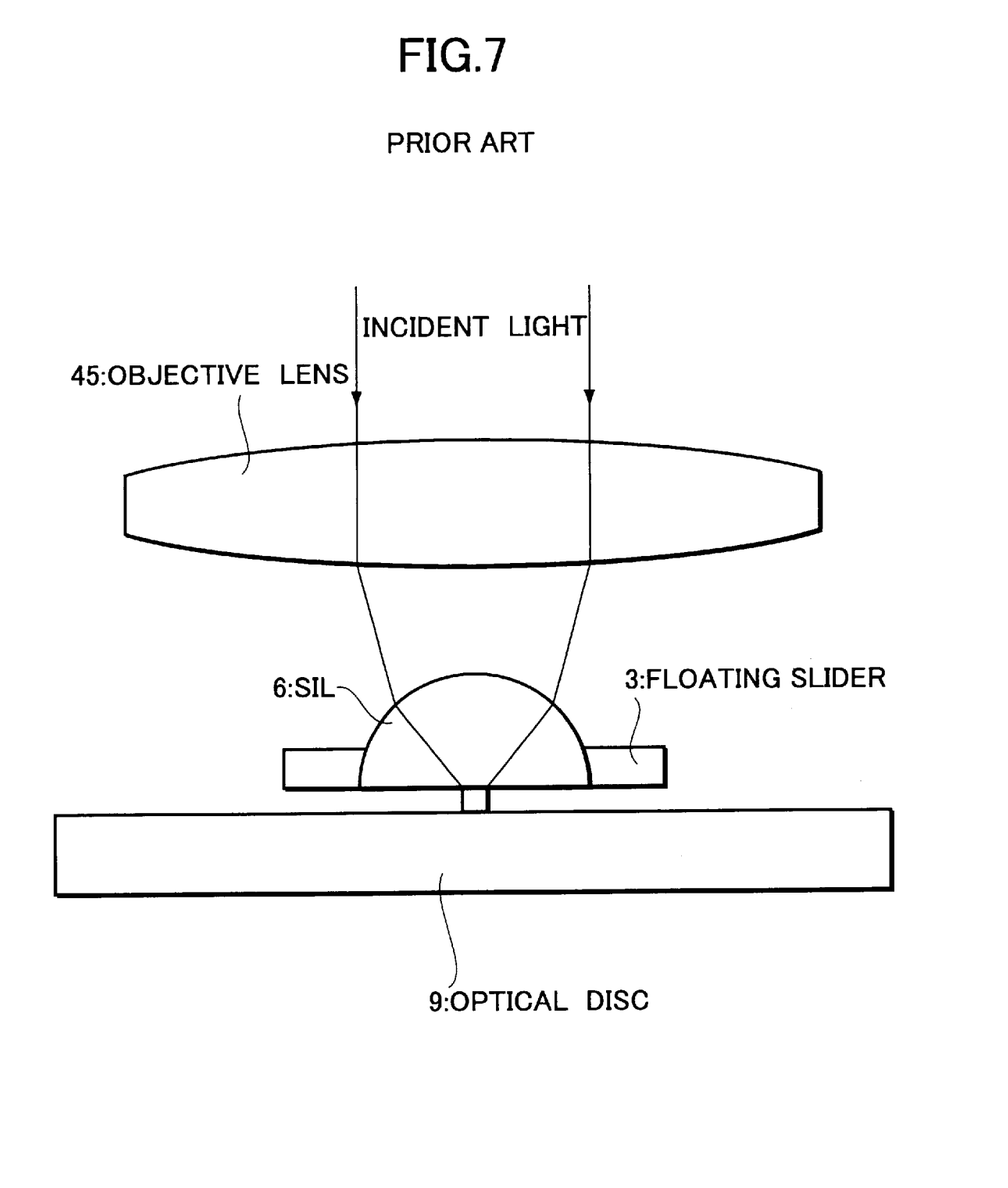
FIG. 7 is a conceptual view schematically showing a conventional floating slider mounting an SIL.

FIG. 7 shows a conventional SIL. As shown in FIG. 7, an objective lens 45 is provided to converge an incident light beam being directed to the recording surface of an optical disc. The converged light beam is at first incident on to an SIL 6 so as to be further converged before it is incident on to the optical disc. By virtue of the SIL 6, since a light beam to be incident on to the recording surface of the optical disc is further converged, a further smaller beam spot can be formed on the recording surface of the optical disc, thereby making it possible to record information with a high density.

As shown in the drawing, a floating slider 3 is provided to serve as a support member to support the SIL 6, and is caused to float up and controlled positionally when the optical disc is rotated to conduct information recording or reproducing. By virtue of the floating slider 3, a distance between the optical disc 9 and the SIL 6 may be controlled within 50 to 100 nm during information recording or reproducing.

During information recording or reproducing, when the floating slider 3 mounting the SIL 6 is moved on the rotating optical disc 9, a suspension (not shown) holding the floating slider 3 may be so controlled that it can be moved up and down, thereby allowing the SIL 6 to gradually move from a remote position towards the surface of the optical disc 9.

At this time when the optical disc is rotated, a static electricity will be generated between the disc coated by a resist film and the floating disc 3 formed by ceramic. As a result, the disc 9 and the slide 3 will attract each other or attract surrounding dust, causing the disc and/or slider to be crashed.

SUMMARY OF THE INVENTION

It is an object of the present invention to provide an improved slider moving device and an improved information recording/reproducing apparatus, by making use of a fact that different substances arranged close to each other in electrification precedence cause only small amount of electricity during their friction against one another, so that a first material to be formed on the surface (facing an optical disc)

of a slider is made the same as or similar to (located close to each other in electrification precedence) a second material to be formed on the surface (facing the slider) of the optical disc, thereby ensuring a high reliability for prohibiting generation of an undesired static electricity.

It is another object of the present invention to provide a slider moving device holding a slider mounting a solid immersion lens (serving as a second lens for further converging a light beam condensed by an objective lens), capable of preventing a crash (possibly caused due to a static electricity) of a floating slider.

In a first aspect of the present invention, there is provided an improved slider moving device wherein a slider mounting an information reading or recording means is moved to a predetermined position in a direction approaching an information recording medium, and is also moved to a predetermined position in a radial direction of the information recording medium, characterized in that: a first material formed on the slider's one surface facing the information recording medium is the same as or close to, in the electrification precedence, a second material formed on the information recording medium's one surface facing the slider.

According to the above constitution, a friction between two materials which are the same as or close to each other in the electrification precedence is not easy to generate a static electricity, or will generate only a small amount of an electricity if such an electricity is generated. Therefore, it is possible to prevent an undesired attraction between the slider and the information recording medium such as an optical disc, and to prevent surrounding dust from being attracted to the disc and the slider, thereby making it possible to provide a slider moving device having a high reliability.

In a second aspect of the present invention, the slider is comprised of the first material, except an information reading or recording means. According to such a constitution, since the slider is formed by a material which is the same as or close (in the electrification precedence) to a surface material of an information recording medium, a friction between the two materials is not easy to generate a static electricity, or will generate only a small amount of an electricity if such an electricity is generated. Therefore, it is possible to prevent an undesired attraction between the slider the information recording medium such as an optical disc, and to prevent surrounding dust from being attracted to the disc and the slider so as to prevent a crash between them. Thus, it is possible to avoid an unfavourable effect on the information reading or recording means, thereby making it possible to provide a slider moving device having a high reliability.

In a third aspect of the present invention, only the slider's one surface facing the information recording medium is comprised of the first material. According to such a constitution, a friction between two materials which are the same as or close to each other in the electrification precedence is not easy to generate a static electricity, or will generate only a small amount of an electricity if such an electricity is generated. Therefore, it is possible to prevent an undesired attraction between the slider and the information recording medium such as an optical disc, and to prevent surrounding dust from being attracted to the disc and the slider.

In a fourth aspect of the present invention, the information reading or recording means is located at a position which is separated from the information recording medium by a predetermined distance, and includes a solid immersion lens for further converging a converged laser beam, the slider's one surface facing the information recording medium is formed by the first material, except one portion thereof located in the vicinity of the light path of the converged laser beam. According to such a constitution, since, except one portion thereof located in the vicinity of the light path of the converged laser beam, the slider is formed by a material which is the same as or close (in the electrification precedence) to the material formed on the surface of the information recording medium, a friction between the two materials is not easy to generate a static electricity, or will generate only a small amount of an electricity if such an electricity is generated. Therefore, it is possible to prevent an undesired attraction between the slider the information recording medium such as an optical disc, and to prevent surrounding dust from being attracted to the disc and the slider. Thus, it is possible to avoid an unfavourable effect on the information reading or recording means, thereby making it possible to provide a slider moving device having a high reliability.

In a fifth aspect of the present invention, there is provided an information recording and reproducing apparatus, wherein a slider mounting an optical head for conducting information reading or writing is moved to a predetermined position in a direction approaching an information recording medium, and is also moved to a predetermined position in a radial direction of the information recording medium, said apparatus comprising: a spindle motor for rotating the information recording medium; an optical system for converging a light beam emitted from a light source; an actuator for integrally driving the optical system, and the slider which is located at a position separated from the information recording medium by a predetermined distance, and mounts a solid immersion lens for further converging a converged laser beam, a first material formed on the slider's one surface facing the information recording medium is the same as or close to, in the electrification precedence, a second material formed on the information recording medium's one surface facing the slider.

According to the above construction, it is allowed to make use of the fact that a friction between two materials which are close to each other in the electrification precedence will generate only a small amount of an electricity if such an electricity is generated. Therefore, a first material formed on the slider's one surface facing the information recording medium is the same as or close to (in the electrification precedence) a second material formed on the information recording medium's one surface facing the slider. Therefore, it has become possible to provide an information recording and reproducing apparatus capable of effectively inhibiting the generation of a static electricity.

In a sixth aspect of the present invention, there is provided another improved slider moving device, wherein a slider mounting a second lens for further converging a laser beam converged by an objective lens is floated upwardly to a predetermined position in a direction approaching an optical disc, and also moved to a predetermined position in a radial direction of the optical disc, characterized in that the slider's one surface facing the optical disc is formed by an electrically conductive material, and has an earth means permitting the slider to be earthed by way of the electrically conductive material.

According to the sixth aspect of the present invention, since the slider's one surface facing the optical disc is provided with an electric conductivity so that the slider is earthed, it is possible to prevent an unnecessary action of a force caused due to a static electricity generated between the slider and the optical disc, thereby preventing surrounding dust from being attracted to the slider and disc, thus ensuring a stabilized information recording using the SIL.

In a seventh aspect of the present invention, the slider's one surface facing the optical disc is formed by an electrically conductive material, except one portion thereof through which a laser beam passes through the second lens.

According to the seventh aspect of the present invention, when the slider's one surface facing the optical disc is provided with an electric conductivity so that the slider is earthed, since the slider's one surface facing the optical disc is formed by an electrically conductive material, except one portion thereof through which a laser light (passing through the second lens) passes, there would not be any unfavourable effect on a laser beam irradiating (through the LIL) the optical disc, thereby ensuring a stabilized information recording using the SIL.

In an eighth aspect of the present invention, the earth means is provided so that the slider connected with a suspension and movable in the radial direction of the optical disc, is earthed by way of the slider and the suspension connected with the slider.

According to the eighth aspect of the present invention, since the slider's one surface facing the optical disc is provided with an electrically conductivity so that the slider is earthed, and since the slider connected with a suspension and movable in the radial direction of the optical disc, is earthed by way of the suspension, it is possible to prevent an unnecessary action of a force caused due to a static electricity generated between the slider and the optical disc, thereby preventing surrounding dust from being attracted to the slider and disc, thus ensuring a stabilized information recording using the SIL.

The above objects and features of the present invention will become better understood from the following description with reference to the accompanying drawings.

DETAILED DESCRIPTION OF THE PREFERRED EMBODIMENTS

Figure 1:
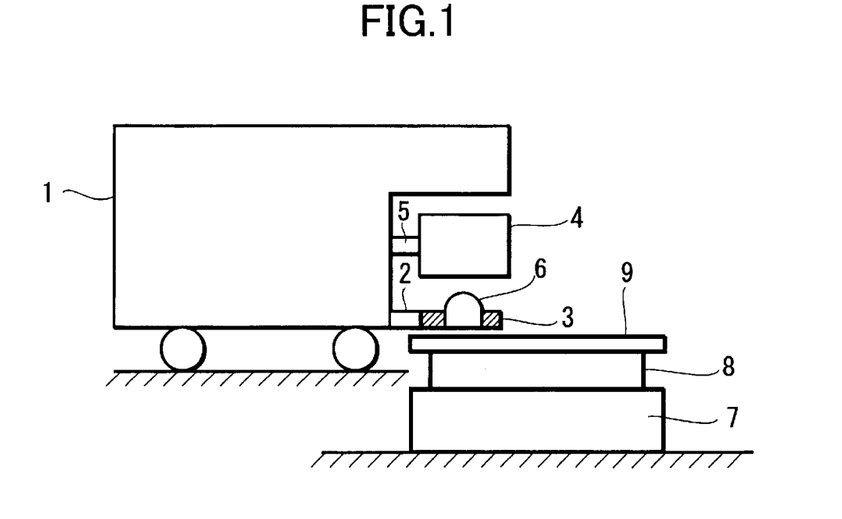
FIG. 1 is an explanatory view schematically showing the constructions of the slider moving device and the information recording/reproducing device, formed according to the present invention.

FIG. 1 is an explanatory view schematically showing the constructions of the slider moving device and the information recording/reproducing apparatus, formed according to the present invention.

Referring to FIG. 1, a slider moving/optical head driving device 1 is provided to control the movement of a floating slider 3 and an optical head 4 in the radial direction of an optical disc 9. The floating slider 3 is supported by a suspension 2, while the optical head is supported by an actuator 5. In addition, the optical head 4 is controlled through the actuator 5 in a manner such that it can move in a direction perpendicular to the surface of the optical disc 9. A solid immersion lens 6 is mounted on the floating slide 3. A spindle motor 7 is provided to rotate the optical disc 9 mounted on a turntable 8.

Figure 2:
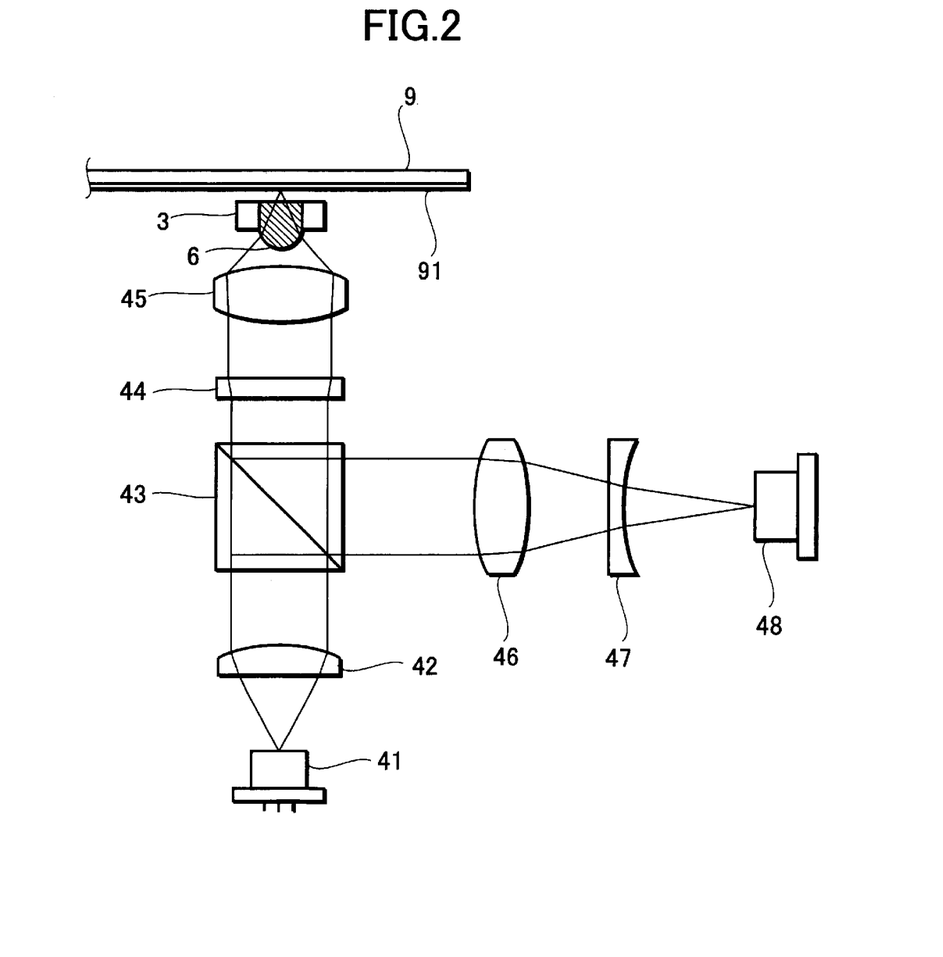
FIG. 2 is another explanatory view schematically showing an internal construction of an optical system including a floating slider holding the optical head and the solid immersion lens.

FIG. 2 is another explanatory view schematically showing the internal construction of an optical system including the optical head 4 shown in FIG. 1 and a floating slider 3 holding the solid immersion lens 6.

The optical system in the present embodiment comprises a laser light source 41 such as a semiconductor laser, a collimator lens 42 (for converting a light emitted from the laser light source 41 into a parallel light), a polarizing beam splitter 43, a ¼ wavelength plate, an objective lens 45, a converging lens 46, a concave lens 47, a photodetector 48. Further, the optical system of the present embodiment includes a solid immersion lens 6 for converging a light beam converged by the objective lens 45, a floating slider 3 for holding the solid immersion lens 6.

Figure 3:
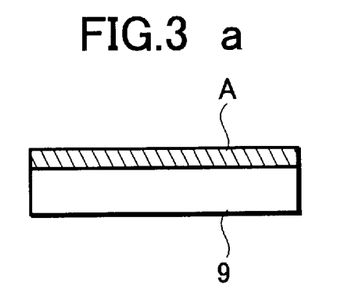
FIGS. 3a–3d are explanatory views schematically showing a specific treatment involved in a process for manufacturing the floating slider.
Figure 4:
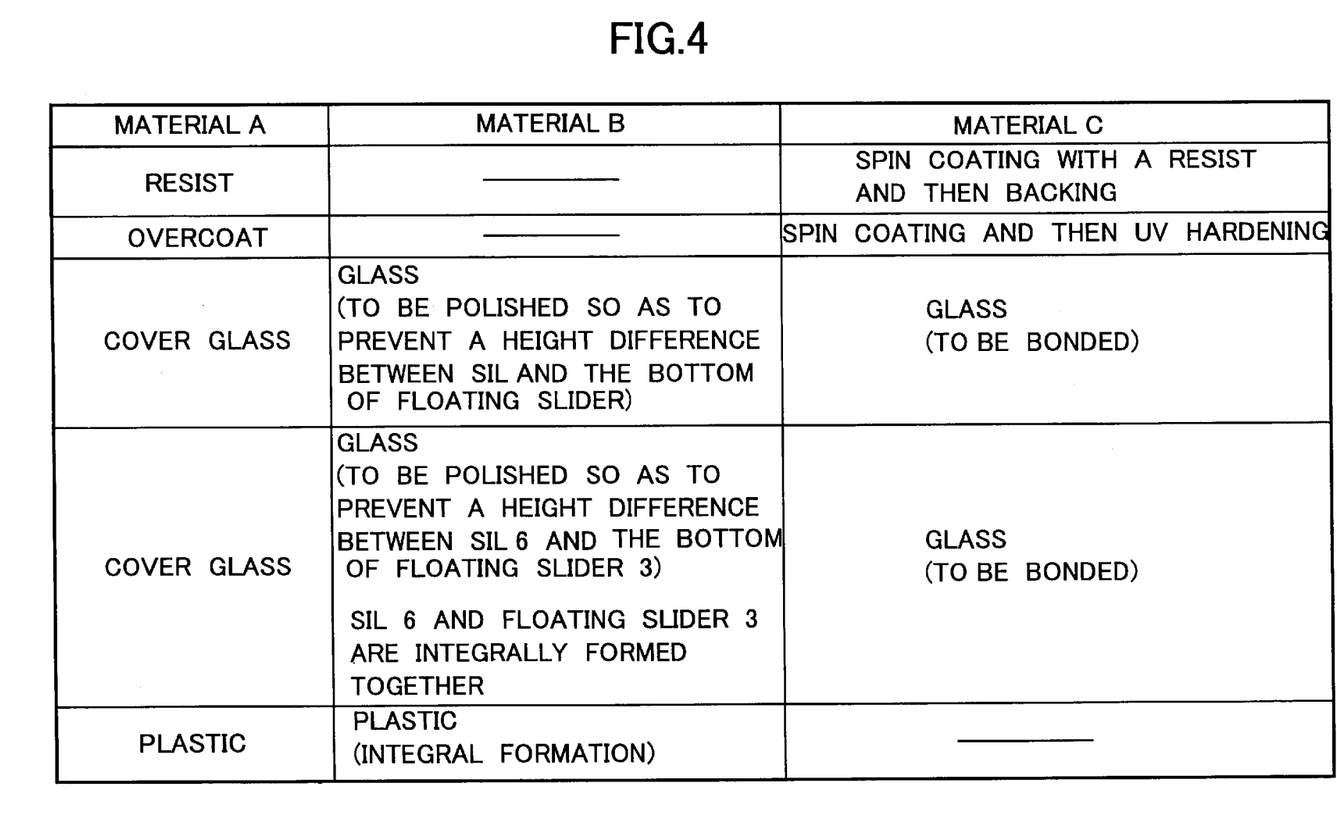
FIG. 4 is a table indicating a relationship between materials forming the optical disc and the materials forming the floating slider.

FIGS. 3a–3b are explanatory views schematically showing a specific treatment involved in a process for manufacturing the floating slider 3, which specific treatment is for preventing a crash that would otherwise be caused due to a static electricity on the floating slider 3 mounting the solid immersion lens 6. Further, FIG. 4 is a table indicating a relationship between materials forming the optical disc 9 and the materials forming the floating slider 3. In detail, the table shows a relationship between materials A forming the surface of the optical disc 9 and materials B (selected depending upon materials A) forming the floating slider 3. The table also shows coating materials C1 and C2 to be formed on the floating slider's one surface facing the optical disc 9.

Here, material C1 is formed on the floating slider's one entire surface facing the optical disc 9 by coating the surface with a substance C. Material C2 is also formed on the floating slider's one entire surface in the same manner as material C1 except that coating is not formed on an area x which is supposed to receive a beam spot of a laser light, based on a supposition that if the coating treatment is performed on this area, it will be difficult for a light beam of a certain wavelength to pass therethrough.

As shown in FIG. 4, when the surface of the optical disc 9 is coated with a resist layer A, one surface (facing the resist layer A of the optical disc 9) of the floating slider 3 is also coated with the same resist, and then subjected to a baking treatment. On the other hand, when the surface of the optical disc 9 is further overcoated with another material, the floating slider's one surface (facing the optical disc 9) is subjected to a spin coating treatment and then to an UV hardening treatment.

Furthermore, when the surface of the optical disc 9 is covered by a glass material, the floating slider 3 as a whole can also be made of a glass material and then subjected to a polishing treatment in order that when the solid immersion lens 6 is attached to the floating slider 3, no height difference will be formed between the bottom of the solid immersion lens 6 and the bottom of the floating slider 3. Alternatively, it is also possible that the floating slider 3 and the solid immersion lens 6 may be integrally formed together. Furthermore, it is allowed to consider that one surface (facing the optical disc 9) of the floating slider 3 may be covered by a glass.

In addition, when the surface of the optical disc 9 is covered by a plastic material, the surface (facing the plastic surface of the optical disc 9) of the floating slider 3 may also be covered by the plastic material.

It is understood from the above description that, by making use of a fact that a friction between different substances (located close to each other in the electrification precedence) will produce only a small electrification amount. It is also understood from the above description that, by manufacturing the floating slider 3 using a material close (in the electrification precedence) to the resist film formed on the surface of the optical disc or by coating the floating slider 3 with the same resist, it is possible to prevent the generation of an undesired static electricity, thereby eliminating the possibility of the aforementioned crash.

Figure 5:
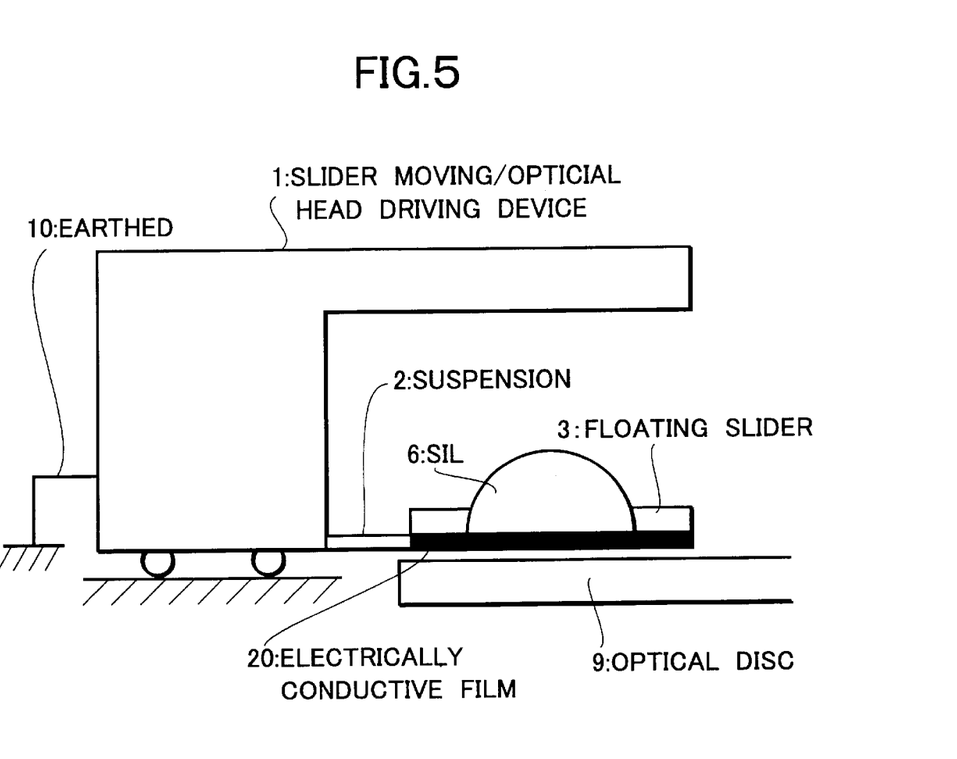
FIG. 5 is a conceptual view schematically showing a specific treatment performed on the floating slider, and also showing an earth means for use with the slider moving device.

FIG. 5 is an explanatory view schematically showing a specific treatment involved in a process for manufacturing the floating slider 3, which specific treatment is for preventing a crash that would otherwise be caused due to a static electricity on the floating slider 3 mounting the solid immersion lens 6. FIG. 5 is also used to explain an earth means for the slider moving/optical head driving device 1. As shown in FIG. 5, the slider moving/optical head driving device 1 is provided to control the movement (in the radial direction of the optical disc 9) of the floating slider 3 supported by the suspension 2. An SIL 6 is mounted on the floating slider 3.

In order to prevent the generation of a static electricity between the floating slider 3 and the optical disc 9, the floating slider's one surface (facing the optical disc 9) is coated with an electrically conductive film 20 so as to provide the floating slider 3 with an electrical conductivity. Here, the electrically conductive film 20 may be formed by a metal such as gold, silver, platinum, copper, aluminium, or formed by ITO (Indium-Tin Oxide).

The suspension 2 is formed by an electrically conductive material such as stainless steel. The suspension 2 and the floating slider 3 are electrically connected with each other by way of an electrically conductive material such as an electrically conductive film or a wire.

Furthermore, the slider moving/optical head driving device 1 is formed by an electrically conductive material such as aluminium. Moreover, the slider moving/optical head driving device 1 is earthed by an earth means 10 formed of a metal.

In this way, since the slider is also earthed, it is possible to prevent the generation of a static electricity between the floating slider 3 and the optical disc 9.

Figure 6:
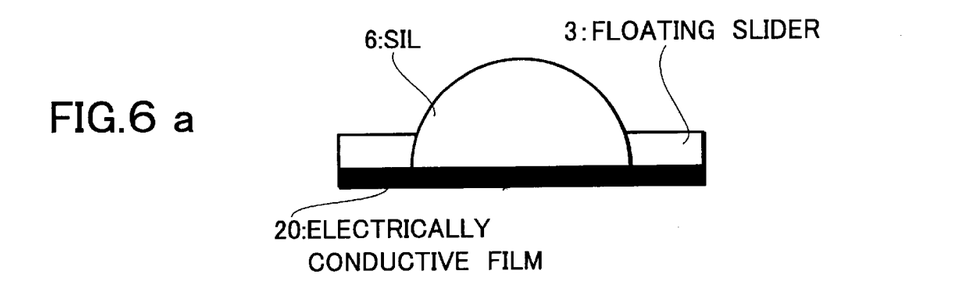
FIGS. 6a and 6b are conceptual views, schematically showing a specific treatment performed on the floating slider.

FIGS. 6a and 6b are conceptual views illustrating the treatment performed on the floating slider.

FIG. 6a shows an example in which the floating slider's one surface (facing the optical disc 9) is entirely coated with an electrically conductive film 20 which is a light transmissive ITO.

FIG. 6b shows another example in which the floating slider's one surface (facing the optical disc 9) is coated with an electrically conductive film 20, except one portion thereof through which the light beam (passing through the SIL 6) passes. Since the one portion (allowing the passing of the light beam) of the floating slider 3 is not coated by the electrically conductive film, there would not be any unfavourable effect on the laser beam passing through the SIL and irradiating the optical disc, thereby ensuring a stabilized information recording using the SIL 6. Here, the electrically conductive film 20 can be made of an opaque metal such as gold, silver, platinum, copper, aluminium.

Although several embodiments have been described in the above, this invention should not be limited to the above described embodiments. This means that the above described embodiments are only used to explain the invention rather than limit it. In fact, technical scope of the present invention includes any other examples having substantially the same technical ideas and offering similar effects. For example, although the above embodiments teach that the slider moving device and the optical head are controlled as an integrally formed unit, it is in fact also possible that they can be controlled individually, as mutually independent devices.

As may be understood from the above description, by virtue of the first aspect of the present invention, a friction between two materials which are the same as or close to each other in the electrification precedence is not easy to generate a static electricity, or will generate only a small amount of an electricity if such an electricity is generated. Therefore, it is possible to prevent an undesired attraction between the slider and the information recording medium such as an optical disc, and to prevent surrounding dust from being attracted to the disc and the slider, thereby making it possible to provide a slider moving device having a high reliability.

By virtue of the second aspect of the present invention, since, except an information reading or recording means, the slider is comprised of a material which is the same as or close (in the electrification precedence) to a surface material of an information recording medium, a friction between the two materials is not easy to generate a static electricity, or will generate only a small amount of an electricity if such an electricity is generated. Therefore, it is possible to prevent an undesired attraction between the slider the information recording medium such as an optical disc, and to prevent surrounding dust from being attracted to the disc and the slider so as to prevent a crash between them. Thus, it is possible to avoid an unfavourable effect on the information reading or recording means, thereby making it sure to provide a slider moving device having a high reliability.

By virtue of the third aspect of the present invention, since only the surface facing the information recording medium is comprised of the first material, a friction between two materials which are the same as or close to each other in the electrification precedence is not easy to generate a static electricity, or will generate only a small amount of an electricity if such an electricity is generated. Therefore, it is possible to prevent an undesired attraction between the slider and the information recording medium such as an optical disc, and to prevent surrounding dust from being attracted to the disc and the slider.

By virtue of the fourth aspect of the present invention, since, except one portion thereof located in the vicinity of the light path of the converged laser beam, the slider is formed by a material which is the same as or close (in the electrification precedence) to the material formed on the surface of the information recording medium, a friction between the two materials is not easy to generate a static electricity, or will generate only a small amount of an electricity if such an electricity is generated. Therefore, it is possible to prevent an undesired attraction between the slider the information recording medium such as an optical disc, and to prevent surrounding dust from being attracted to the disc and the slider. Thus, it is possible to avoid an unfavourable effect on the information reading or recording means, thereby making it sure to provide a slider moving device having a high reliability.

By virtue of the fifth aspect of the present invention, it is allowed to make use of the fact that a friction between two materials which are close to each other in the electrification precedence will generate only a small amount of an electricity if such an electricity is generated. Therefore, a first material formed on the slider's one surface facing the information recording medium is made the same as or close to (in the electrification precedence) a second material formed on the information recording medium's one surface facing the slider. Therefore, it has become possible to provide an information recording and reproducing apparatus capable of effectively inhibiting the generation of an undesired static electricity.

By virtue of the sixth aspect of the present invention, since the slider's one surface facing the optical disc is formed by an electrically conductive material so that the slider is earthed, it is possible to prevent an unnecessary action of a force caused due to a static electricity generated between the slider and the optical disc, thereby preventing surrounding dust from being attracted to the slider and disc, thus ensuring a stabilized information recording using the SIL.

By virtue of the seventh aspect of the present invention, when the slider's one surface facing the optical disc is formed by an electrically conductive material so that the slider is earthed, since the slider's one surface facing the optical disc is formed by an electrically conductive material except one portion thereof through which a laser light (passing through the second lens) passes, there would not be any unfavourable effect on a laser light irradiating (through the LIL) the optical disc, thereby ensuring a stabilized information recording using the SIL.

By virtue of the eighth aspect of the present invention, since the slider's one surface facing the optical disc is provided with an electrically conductivity so that the slider is earthed, and since the slider connected with a suspension and movable in the radial direction of the optical disc, is earthed by way of the suspension, it is possible to prevent an unnecessary action of a force caused due to a static electricity generated between the slider and the optical disc, thereby preventing surrounding dust from being attracted to the slider and disc, thus ensuring a stabilized information recording using the SIL.

While the presently preferred embodiments of the this invention have been shown and described above, it is to be understood that these disclosures are for the purpose of illustration and that various changes and modifications may be made without departing from the scope of the invention as set forth in the appended claims.

What is claimed is:

1. A slider moving device wherein a slider mounting an information reading or recording means is moved to a predetermined position in a direction approaching an information recording medium, and is also moved to a predetermined position in a radial direction of the information recording medium, characterized in that:

a first material formed on at least a portion of a slider surface facing the information recording medium is the same as or close to, in the electrification precedence, a second material formed on an information recording medium surface facing the slider.

2. A slider moving device according to claim 1, wherein only the slider surface facing the information recording medium is comprised of the first material.

3. A slider moving device according to claim 1, wherein the information reading or recording means is located at a position which is separated from the Information recording medium by a predetermined distance, and includes a solid immersion lens for further converging a converged laser beam, the slider surface facing the information recording medium is formed by the first material, except one portion thereof located in the vicinity of the light path of the converged laser beam.

4. A slider moving device, wherein a slider mounting an information reading or recording means is moved to a predetermined position in a direction approaching an information recording medium, and is also moved to a predetermined position in a radial direction of the information recording medium, characterized in that:

a first material formed on at least a portion of a slider surface facing the information recording medium is the same as or close to, in the electrification precedence, a second material formed on an information recording medium surface facing the slider, wherein said slider is comprised of the first material, except the information reading or recording means.

5. An information recording and reproducing apparatus, wherein a slider mounting an optical head for conducting information reading or writing is moved to a predetermined position in a direction approaching an information recording medium, and is also moved to a predetermined position in a radial direction of the information recording medium, said apparatus comprising:

a spindle motor for rotating the information recording medium;

an optical system for converging a light beam emitted from a light source;

an actuator for integrally driving the optical system, and the slider which is located at a position separated from the information recording medium by a predetermined distance, and mounts a solid immersion lens for further converging a converged laser beam, a first material formed on a slider surface facing the information recording medium is the same as or close to, in the electrification precedence, a second material formed on the information recording medium surface facing the slider.

6. A slide moving device, wherein a slider mounting a second lens for further converging a laser beam converged by an objective lens is floated upwardly to a predetermined position in a direction approaching an optical disc, and also moved to a predetermined position in a radial direction of the optical disc, characterized in that:

a portion of the slider surface facing the optical disc is formed by an electrically conductive material, and has an earth means permitting the slider to be earthed by way of the electrically conductive material.

7. A slide moving device according to claim 6, wherein the slider surface facing the optical disc is formed by an electrically conductive material, except one portion thereof through which a laser light passes through the second lens.

8. A slide moving device according to claim 6, wherein the earth means is provided so that the slider connected with a suspension and movable in the radial direction of the optical disc, is earthed by way of the slider and the suspension connected with the slider.

* * * * *